Patented Nov. 6, 1951

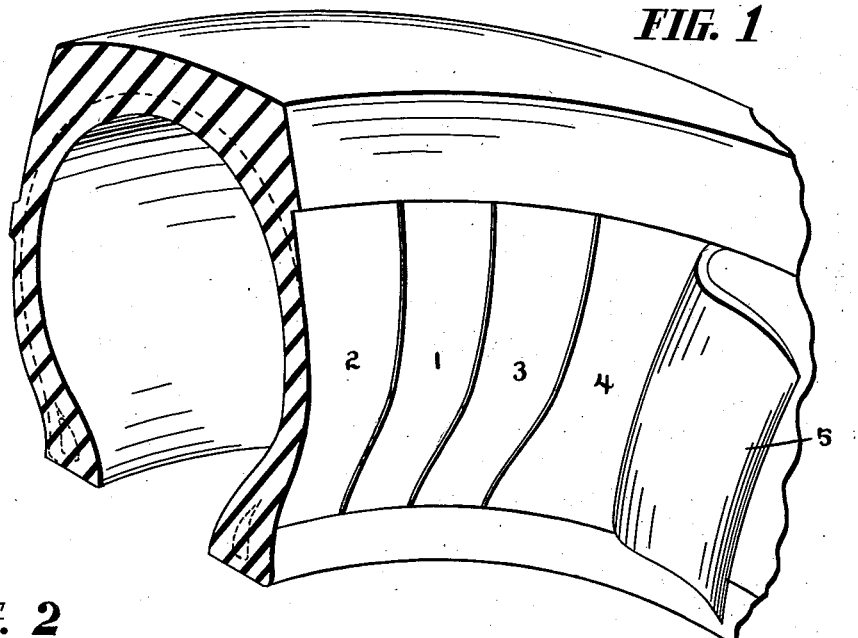
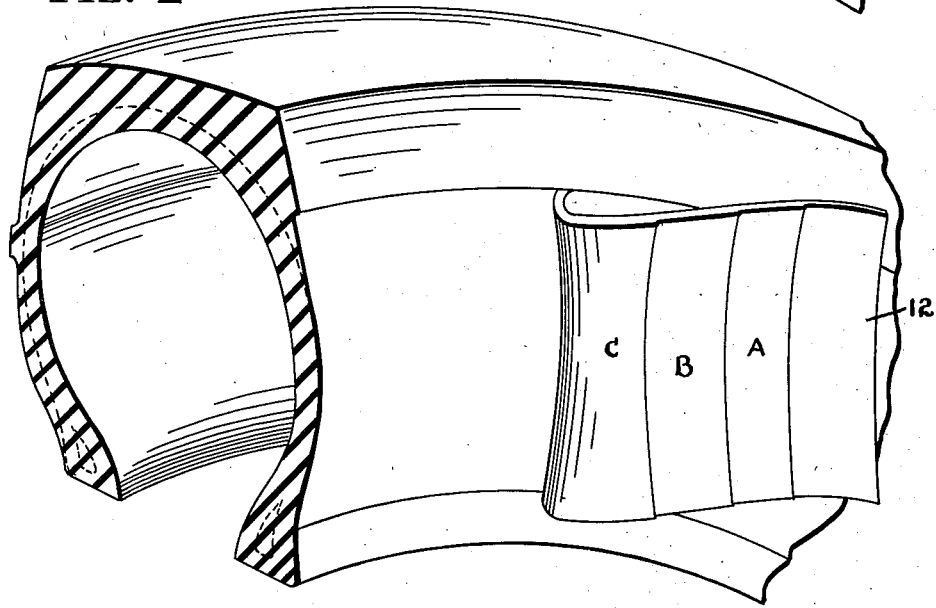

2,574,233

UNITED STATES PATENT OFFICE 2,574,233

WHITE SIDE WALL TIRE

Ralph F. Wolf, Akron, Ohio

Application April 12, 1948, Serial No. 20,431

1 Claim. (Cl. 152—330)

This invention relates to an improved white-sidewall tire.

The construction of pneumatic tires having white sidewalls instead of conventional black sidewalls is attended by certain difficulties which not only make such tires more costly but also less serviceable than tires having black walls.

This is caused by the fact that the choice of softeners or plasticizers, of accelerators, and of antioxidants that can be used in the carcass and under the white sidewall is limited to materials which will not stain the white wall. Many of the cheapest materials and many of the materials which will impart the best properties to carcass compounds can not be used for this reason. If used in the carcass they would "bleed" through the white wall and change it to an unsightly yellow or brown color.

For example, some of the cheapest petroleum oils, tars, and still residues, which are excellent rubber softeners can not be used in white sidewall tire construction because they will stain badly. Instead, highly refined materials, which are much more expensive, must be employed.

An even better example can be found in considering antioxidants. It is almost axiomatic that antioxidants which do not stain have little value in imparting age resisting qualities to a rubber stock. On the other hand, the best antioxidants, such as phenyl beta naphthylamine stain badly.

The migration or "bleeding" of staining materials can be prevented by interposing an impermeable barrier between the carcass of the tire and the white sidewall. However, in order to work satisfactorily, such a barrier must be flexible so that it will bend with the tire and it must be a material to which the rubber compounds will adhere tightly. Up to the present time, there has been no method of tire construction known by means of which a flexible, impermeable barrier could be made an integral part of the tire.

According to this invention a thin barrier of nylon or the like is used between the carcass and the white sidewall. The barrier may be any long-chain, synthetic, polymeric-amide plastic which has recurring amide groups as an integral part of the main polymer chain. The barrier is advantageously incorporated in the tire by being applied to either the outer surface of the carcass or the inner surface of the white sidewall in solution. For this purpose the alcohol-soluble plastic of the type marketed by E. I. du Pont de Nemours and Company, of Wilmington, Delaware, as Nylon Flake is very satisfactory.

The invention will be further described in connection with the accompanying drawings.

Fig. 1 is a sectional view illustrating the application of the several coatings to a tire (with the successive coatings partially removed to illustrate each), with the white sidewall turned back; and Fig. 2 is a sectional view illustrating the application of a white sidewall to which the several coatings have been applied (with the successive coatings partially removed to illustrate each).

In building a tire the various plies and other elements are assembled by the tire builder at a tire machine. Nylon does not adhere well to rubber. Therefore, it is necessary to use an adhesive on both sides of the nylon barrier in order to secure good adhesion of the barrier to the sidewall and to secure good adhesion of the barrier to the carcass. Fig. 1 shows adhesive 1 applied to the carcass 2 by a brush or spraying. Nylon 3 is then applied in alcohol solution or the like, as for example a solution of Nylon Flake in alcohol, with a second application of adhesive 4 before the white-sidewall strip 5 is put in place. The solvent must be evaporated from the tire after each application of the adhesive and nylon. A single coating of nylon will generally be sufficient although several coats may be applied. After applying the sidewall strip the uncured tire will be completed in the usual manner and then cured.

The use of solvent-containing solutions by the tire builder will ordinarily be objectionable as it will be necessary for him to wait for each coating to dry before proceeding with another coat or the application of the white-sidewall strip to the carcass. This will delay operations at the tire building machine. In machines of the so-called "merry-go-round" type which employ several operators, each of which completes only one or a few operations the use of solvents may not be objectionable.

Ordinarily the preferred method will involve coating one side of the white-sidewall strip before it is delivered to the tire builder. The calendered or extruded strip is treated successively with adhesive, a nylon solution, and a second coating of adhesive. These coatings may be applied by spraying or brushing or in any suitable manner. The strip may be passed through drying tunnels and the application of the several solutions may be carried out within these tunnels if desired. After completing these three coating operations the strip will be cut to length in the usual way. Fig. 2 shows the application of such a sidewall strip to the carcass of a tire. The adhesive—at least the outer coating of adhesive—will usually be of the type which dries to sufficient tackiness to temporarily hold the sidewall strip in place during transfer of the unvulcanized carcass from the tire builder to the mold for curing.

The completed tire constructed in either of these ways is the same. The white-sidewall strip is separated from the carcass by a nylon barrier and this nylon is held to the carcass and to the white sidewall by a suitable adhesive. Such an adhesive can be made by adding 22.2 pounds of water and 2 pounds of 28 per cent NH$_4$OH to 36.7 pounds of latex and then adding 39.1 pounds of a previously prepared resorcinol-formaldehyde master batch. The latter is made by adding 4.77 pounds of resorcinol and 6.4 pounds of one per cent NaOH to 78.33 pounds of water, and then adding 10.5 pounds of formaldehyde and allowing the mixture to stand for eight hours.

The nylon barrier may, of course, be applied as a film but ordinarily a thinner barrier can be produced by coating, and a thin complete barrier is all that is required. The nylon is highly flexible and has no effect whatever upon the functioning, aging or curing of the tire.

Other ways for constructing the tire will appear to the man skilled in the art.

What I claim is:

A tire with a white sidewall, and between the sidewall and the carcass of the tire a thin layer of long-chain, synthetic, polymeric-amide plastic which has recurring amide groups as an integral part of said chain, said layer serving as a barrier to prevent discoloration of the sidewall by migration of discoloring material from the carcass.

RALPH F. WOLF.

REFERENCES CITED

The following references are of record in the file of this patent:

UNITED STATES PATENTS

| Number | Name | Date |
| --- | --- | --- |
| 2,240,855 | Phillips | May 6, 1941 |
| 2,240,856 | Phillips | May 6, 1941 |
| 2,291,208 | Brown et al. | July 28, 1942 |
| 2,349,290 | Loughborough | May 23, 1944 |
| 2,381,739 | Gray | Aug. 7, 1945 |
| 2,402,021 | Compton | June 11, 1946 |
| 2,421,613 | Gray et al. | June 3, 1947 |
| 2,440,965 | Merrill et al. | May 4, 1948 |
| 2,458,886 | Weeldenburg | Jan. 11, 1949 |
| 2,499,724 | Compton | Mar. 7, 1950 |